US012530962B2

(12) United States Patent
Stenneth et al.

(10) Patent No.: US 12,530,962 B2
(45) Date of Patent: Jan. 20, 2026

(54) SELECTING TRAFFIC ALGORITHMS TO GENERATE TRAFFIC DATA

(71) Applicant: Microsoft Technology Licensing, LLC, Redmond, WA (US)

(72) Inventors: Leon Oliver Stenneth, Chicago, IL (US); Catalin Bogdan Capota, Chicago, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 17/843,067

(22) Filed: Jun. 17, 2022

(65) Prior Publication Data

US 2023/0410643 A1  Dec. 21, 2023

(51) Int. Cl.
*G08G 1/01* (2006.01)
*G01C 21/34* (2006.01)

(52) U.S. Cl.
CPC ....... *G08G 1/0129* (2013.01); *G01C 21/3492* (2013.01); *G08G 1/0112* (2013.01); *G08G 1/0116* (2013.01)

(58) Field of Classification Search
CPC .. G08G 1/0129; G08G 1/0112; G08G 1/0116; G01C 21/3492
USPC ........................................................ 701/533
See application file for complete search history.

(56) References Cited

U.S. PATENT DOCUMENTS

| | | | | |
|---|---|---|---|---|
| 11,577,747 B2* | 2/2023 | Berger | ................ | B60W 60/0011 |
| 2009/0005958 A1* | 1/2009 | Roesser | ................ | G08G 1/0104 |
| | | | | 701/117 |
| 2010/0273491 A1* | 10/2010 | Colonna | ............... | G08G 1/0104 |
| | | | | 455/456.3 |
| 2015/0120174 A1* | 4/2015 | Lewis | ................. | G08G 1/0129 |
| | | | | 701/118 |
| 2019/0012909 A1* | 1/2019 | Mintz | ................ | G06Q 30/0206 |
| 2021/0295174 A1* | 9/2021 | Zhang | .................... | G06N 3/082 |
| 2022/0109613 A1* | 4/2022 | Zhong | ..................... | H04L 41/20 |
| 2022/0309919 A1* | 9/2022 | Hoh | ...................... | G08G 1/0145 |
| 2022/0319312 A1* | 10/2022 | Mintz | ................ | G06Q 30/0224 |
| 2022/0383735 A1* | 12/2022 | Shah | ..................... | G07C 5/0841 |
| 2023/0067464 A1* | 3/2023 | Jonietz | ................ | G08G 1/0112 |
| 2023/0138084 A1* | 5/2023 | Kourous-Harrigan | | ..................... |
| | | | | G06V 20/58 |
| | | | | 701/41 |

OTHER PUBLICATIONS

Fonseca, Applicability of position-based routing for VANET in highways and urban environment', Journal of Network and Computer Applications, published 2012 (Year: 2012).*

* cited by examiner

*Primary Examiner* — Andrea C Leggett

(57) ABSTRACT

Methods and systems for generating traffic data are provided. An example method includes receiving one or more routes from a first location to a second location, receiving vehicle data along each of the one or more routes, and segmenting the one or more routes, based on a plurality of grid spaces on a map. The method further includes determining, based on the vehicle data, a first algorithm corresponding to a first grid space from the plurality of grid spaces and a second traffic algorithm corresponding to a second grid space from the plurality of grid spaces. The method further includes generating traffic data, along the one or more routes, using the first algorithm and the second algorithm.

20 Claims, 14 Drawing Sheets

SELECTING TRAFFIC ALGORITHMS TO GENERATE TRAFFIC DATA

BACKGROUND

Traffic estimation algorithms are commonly used to provide an indication of an estimated travel time and a suggested route, based on location data and an amount of traffic on a route along which one plans to travel. Traffic systems are normally powered by one general purpose algorithm that may be used to compute traffic for various road classes and regions across the world.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for generating traffic data, such as estimated travel time, using one or more traffic algorithms.

In some examples, a method for generating traffic data is provided. The method includes receiving one or more routes from a first location to a second location, receiving vehicle data along each of the one or more routes, segmenting the one or more routes, based on a plurality of grid spaces on a map, determining, based on the vehicle data, a first algorithm corresponding to a first grid space from the plurality of grid spaces and a second traffic algorithm corresponding to a second grid space from the plurality of grid spaces, and generating traffic data, along the one or more routes, using the first algorithm and the second algorithm.

In some examples, a method for generating traffic data is provided. The method includes receiving one or more routes from a first location to a second location, receiving vehicle data along each of the one or more routes, receiving road data corresponding to a plurality of road types along each of the one or more routes, segmenting the one or more routes, based on the plurality of road types, determining, based on the vehicle data, a first algorithm corresponding to a first road type from the plurality of road types and a second algorithm corresponding to a second road type from the plurality of road types, and generating traffic data, along the one or more routes, using the first algorithm and the second algorithm.

In some examples, a method for generating traffic data is provided. The method includes receiving a request for directions from a first location to a second location, generating one or more routes from the first location to the second location, receiving vehicle data along each of the one or more routes, receiving road data along each of the one or more routes, generating an estimated travel time from the first location to the second location, for each of the one or more routes, using a respective algorithm for each of the one or more routes, determining a confidence score for each of the estimated travel times based on the vehicle data, road data, and respective algorithm, and generating a report comprising the estimated travel time and the corresponding confidence score, for at least one of the one or more routes.

Some examples further include receiving road data along each of the one or more routes, segmenting the one or more routes, based on a plurality of road types between the first location and the second location, and determining, based on the vehicle data, a third algorithm corresponding to a first road type from the plurality of road types and a fourth algorithm corresponding to a second road type from the plurality of road types. The traffic data, along the one or more routes, is generated using at least two from the group of the first algorithm, the second algorithm, the third algorithm, and the fourth algorithm.

In some examples, the first algorithm is one of a historical algorithm, real-time algorithm, Bayesian inference algorithm, fitted weights algorithm, or deep learning algorithm.

Some examples further include transmitting the traffic data to a remote device.

In some examples, the traffic data includes an estimated travel time from the first location to the second location.

In some examples, the vehicle data corresponds to a number of vehicles travelling along each of the one or more routes.

In some examples, dimensions of each of the plurality of grid spaces are configurable.

Some examples further include segmenting the one or more routes, based on a plurality of grid spaces on a map, and determining, based on the vehicle data, a third algorithm corresponding to a first grid space from the plurality of grid spaces and a fourth traffic algorithm corresponding to a second grid space from the plurality of grid spaces. The traffic data, along the one or more routes, is generated using at least two from the group of the first algorithm, the second algorithm, the third algorithm, and the fourth algorithm.

In some examples, the plurality of road types include one or more from the group of: an interstate, highway, and local road.

In some examples, the road data corresponds to one or more types of roads along each of the one or more routes.

In some examples, the algorithms are each one of a historical algorithm, real-time algorithm, Bayesian inference algorithm, fitted weights algorithm, or deep learning algorithm.

In some examples, the vehicle data is preprocessed to remove a subset of data corresponding to vehicles that have been stationary for longer than a predetermined period of time.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
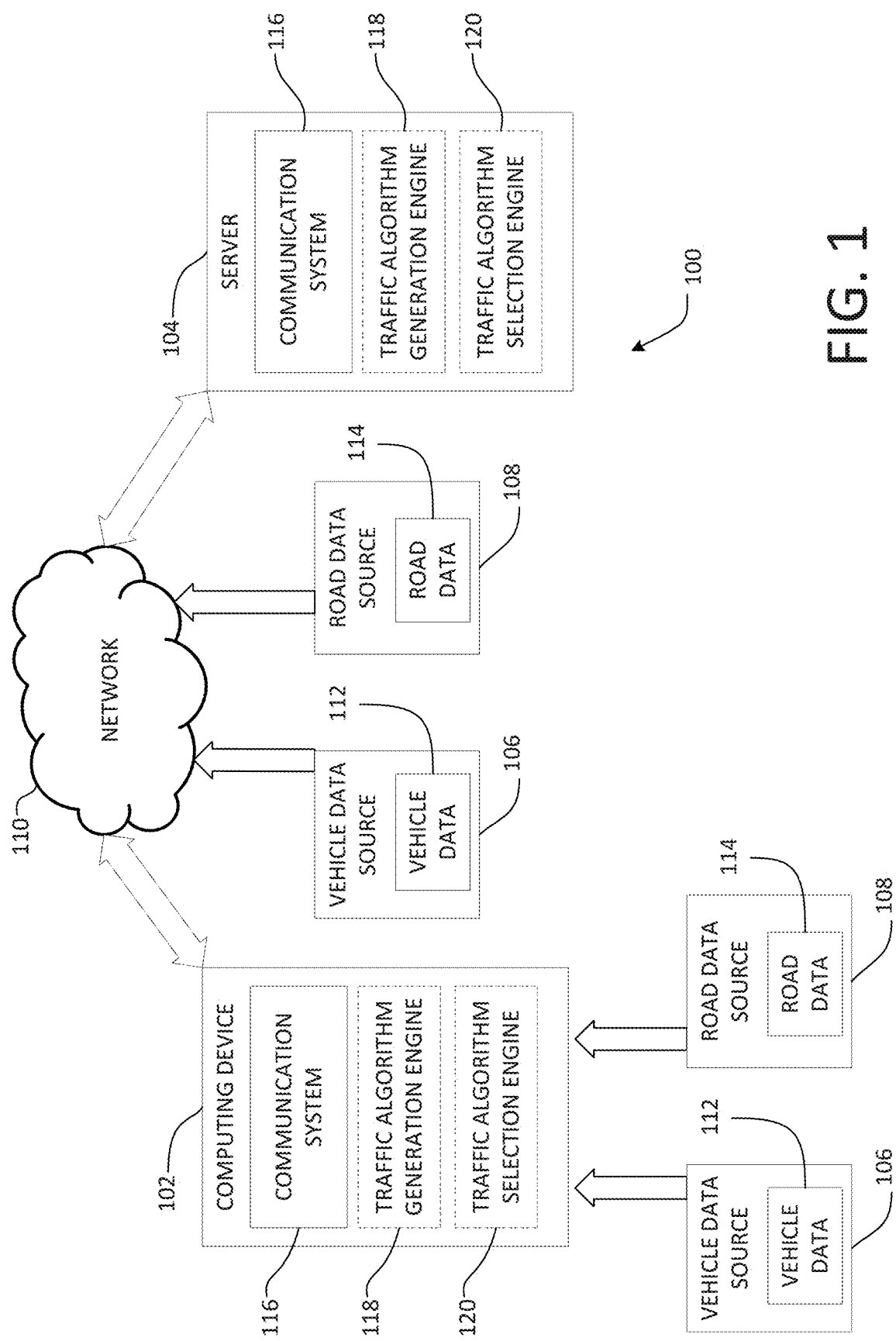
FIG. 1 illustrates an overview of an example system for generating traffic data according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The evolution of cloud computing technology has significantly impacted an amount of computations that are able to be performed remotely. Some examples of computations that may be performed on one or more remote servers (e.g., the cloud) include mapping and traffic algorithms. In some examples, mapping and traffic algorithms may be relied upon for commercial transportation, as well as by everyday individuals looking to get from a first location (e.g., a home, school, grocery store, social event, errand, etc.) to a second location (e.g., a home school, grocery store, social event, errand, etc.).

Often, it is desirable for a person navigating from a first location to a second location to be aware of how much traffic they may encounter along a route from the first location to the second location. Such traffic information may be beneficial to ensure that the person is arriving to the second location on time and/or that that are leaving the first location at an early enough time to avoid traffic and/or arrive at a destination when desired. A degree of accuracy regarding traffic information may be relatively more important to some drivers (e.g., service providers, such as delivery drivers) compared to other drivers (e.g., a driver completing non-urgent errands), particularly if a relatively higher degree of accuracy costs (e.g., computational cost and/or a monetary cost) more than a relatively lower degree of accuracy.

As mentioned above, traffic estimation algorithms are commonly used to provide an indication of an estimated travel time and a suggested route, based on location data and an amount of traffic on a route along which one plans to travel. Traffic systems are normally powered by one general purpose algorithm that may be used to compute traffic for various regions across the world. For example, the general purpose algorithm may be one of Bayesian inference, regression, deep learning, etc. However, a performance of estimating traffic may vary greatly by coverage (e.g., a relative number of vehicles travelling along one or more roads being analyzed). Therefore, it may be inefficient to rely on one general purpose algorithm.

Accordingly, aspects of the present disclosure relate to methods, systems, and media for generating traffic data, such as an estimated travel time, using a plurality of traffic algorithms. Generally, mechanisms disclosed herein may include receiving one or more routes from a first location to a second location, receiving vehicle data along each of the one or more routes, and receiving road data along each of the one or more routes. The one or more routes may be segmented (e.g., partitioned into sections) based on a plurality of grid spaces on a map. Additionally, or alternatively, the one or more routes may be segmented based on a plurality of road types between the first and the second location (e.g., along the one or more routes). Based on the vehicle data, a first algorithm may be determined that corresponds to a first grid space from the plurality of grid spaces and a second traffic algorithm may be determined that corresponds to a second grid space from the plurality of grid spaces. Additionally, or alternatively, a first algorithm may be determined that corresponds to a first road type from the plurality of road types and a second algorithm may be determined that corresponds to a second road type from the plurality of road types. Traffic data (e.g., an estimated travel time from the first location to the second location, a level of congestion between the first and second location, an estimated number of vehicles at a given time, etc.) may be generated using either of the first algorithms and either of the second algorithms.

Advantages of mechanisms disclosed herein may include the ability to use a computationally inexpensive traffic algorithm in a region with low coverage (e.g., a relatively small number of vehicles), while using a computationally expensive traffic algorithm in a region with relatively high coverage (e.g., a relatively large number of vehicles). Such an ability may improve efficiency of traffic data systems, while performing traffic data calculations with an appropriate level of accuracy, based on varying use cases. Further advantages may be apparent to those of ordinary skill in the art, at least in light of the non-limiting examples described herein.

FIG. 1 shows an example of a system 100 for generating traffic data, in accordance with some aspects of the disclosed subject matter. The system 100 includes one or more computing devices 102, one or more servers 104, a vehicle data source 106, a road data source 108, and a communication network or network 110. The computing device 102 can receive vehicle data 112 from the vehicle data source 106, which may be, for example a vehicle (e.g., a car, truck, bus, autonomous vehicle, etc.) that transmits vehicle data, a computer-executed program that generates vehicle data, and/or memory with data stored therein corresponding to vehicle data. The vehicle data 112 may include speed data, direction data, location data, battery data, fuel level data, and/or other vehicle sensor data.

Additionally, or alternatively, the network 110 can receive vehicle data 112 from the vehicle data source 106, which may be, for example a vehicle (e.g., a car, truck, bus, etc.) that transmits vehicle data, a computer-executed program that generates vehicle data, and/or memory with data stored therein corresponding to vehicle data. The vehicle data 112 may include speed data, direction data, location data, time data, battery data, fuel level data, and/or other vehicle sensor data.

Further, the computing device 102 can receive road data 114 from the road data source 108, which may be, for example, a service that provides road data, a computer-executable program that generates road data, and/or memory with data stored therein corresponding to road data. The road data 114 may include information corresponding to one or more different types of roads, such as highways, tollways, alleyways, local roads, country roads, and/or other types of roads which may have different levels of congestion and/or coverage (e.g., number of vehicles travelling therealong). Different types of roads may be recognized by those of ordinary skill in the art, such as, for example, by referencing publications from government transportation agencies (e.g., a local, state, and/or national Department of Transportation).

Additionally, or alternatively, the network 110 can receive road data 114 from the road data source 108, which may be, for example, a service that provides road data, a computer-executable program that generates road data, and/or memory with data stored therein corresponding to road data. The road data 114 may include information corresponding to one or more different types of roads, such as highways, tollways, alleyways, local roads, country roads, and/or other types of roads which may have different levels of congestion and/or coverage (e.g., number of vehicles travelling therealong).

Computing device 102 may include a communication system 116, a traffic algorithm generation engine or component 118, and/or a traffic algorithm selection engine or component 120. In some examples, computing device 102 can execute at least a portion of the traffic algorithm generation component 118 to generate traffic data using one or more different traffic algorithms (e.g., historical profiles, real-time, Bayesian inference, fitted weights, deep learning, etc.). Further, in some examples, computing device 102 can execute at least a portion of the traffic algorithm selection component 120 to determine a level of coverage along a route, determine a confidence score of generate traffic data, analyze user-preferences for traffic data, and/or select one or more traffic algorithms to provide traffic data to a user.

Server 104 may include a communication system 116, a traffic algorithm generation engine or component 118, and/or a traffic algorithm selection engine or component 120. In some examples, server 104 can execute at least a portion of the traffic algorithm generation component 118 to generate traffic data using one or more different traffic algorithms (e.g., historical profiles, real-time, Bayesian inference, fitted weights, deep learning, etc.). Further, in some examples, server 104 can execute at least a portion of the traffic algorithm selection component 120 to determine a level of coverage along a route, determine a confidence score of generate traffic data, analyze user-preferences for traffic data, and/or select one or more traffic algorithms to provide traffic data to a user.

Additionally, or alternatively, in some examples, computing device 102 can communicate data received from vehicle data source 106 and/or road data source 108 to the server 104 over a communication network 110, which can execute at least a portion of traffic algorithm generation component 118 and/or traffic algorithm selection component 120. In some examples, traffic algorithm generation component 118 may execute one or more portions of methods/processes 600, 800, and/or 900 described below in connection with FIGS. 6, 8, and 9. Further, in some examples, traffic algorithm selection component 120 may execute one or more portions of methods/processes 600, 800, and/or 900, described below in connection with FIGS. 6, 8 and 9.

In some examples, computing device 102 and/or server 104 can be any suitable computing device or combination of devices that may be used by a requestor, such as a desktop computer, a vehicle computer, a laptop computer, a smartphone, a tablet computer, a wearable computer, a server computer, a virtual machine being executed by a physical computing device, a web server, etc. Further, in some examples, there may be a plurality of computing device 102 and/or a plurality of servers 104.

In some examples, vehicle data source 106 can be any suitable source of vehicle data (e.g., sensor data generated from one or more sensors of a vehicle, vehicle data recorded by a user, vehicle data obtained from a database of aggregated information from one or more vehicles, etc.). In a more particular example, vehicle data source 106 can include memory storing vehicle data (e.g., local memory of computing device 102, local memory of server 104, cloud storage, portable memory connected to computing device 102, portable memory connected to server 104, etc.).

In another more particular example, vehicle data source 106 can include an application configured to generate vehicle data. In some examples, vehicle data source 106 can be local to computing device 102. Additionally, or alternatively, vehicle data source 106 can be remote from computing device 102 and can communicate vehicle data 112 to computing device 102 (and/or server 104) via a communication network (e.g., communication network 110).

In some examples, road data source 108 can be any suitable source of road data (e.g., a government, corporate, or other type of data store containing road data). In a more particular example, road data source 1008 can include memory storing road data (e.g., local memory of computing device 102, local memory of server 104, cloud storage, portable memory connected to computing device 102, portable memory connected to server 104, etc.).

In another more particular example, road data source 108 can include an application configured to generate road data. In some examples, road data source 108 can be local to computing device 102. Additionally, or alternatively, road data source 108 can be remote from computing device 102 and can communicate road data 114 to computing device 102 (and/or server 104) via a communication network (e.g., communication network 110).

In some examples, communication network 110 can be any suitable communication network or combination of communication networks. For example, communication network 110 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 110 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
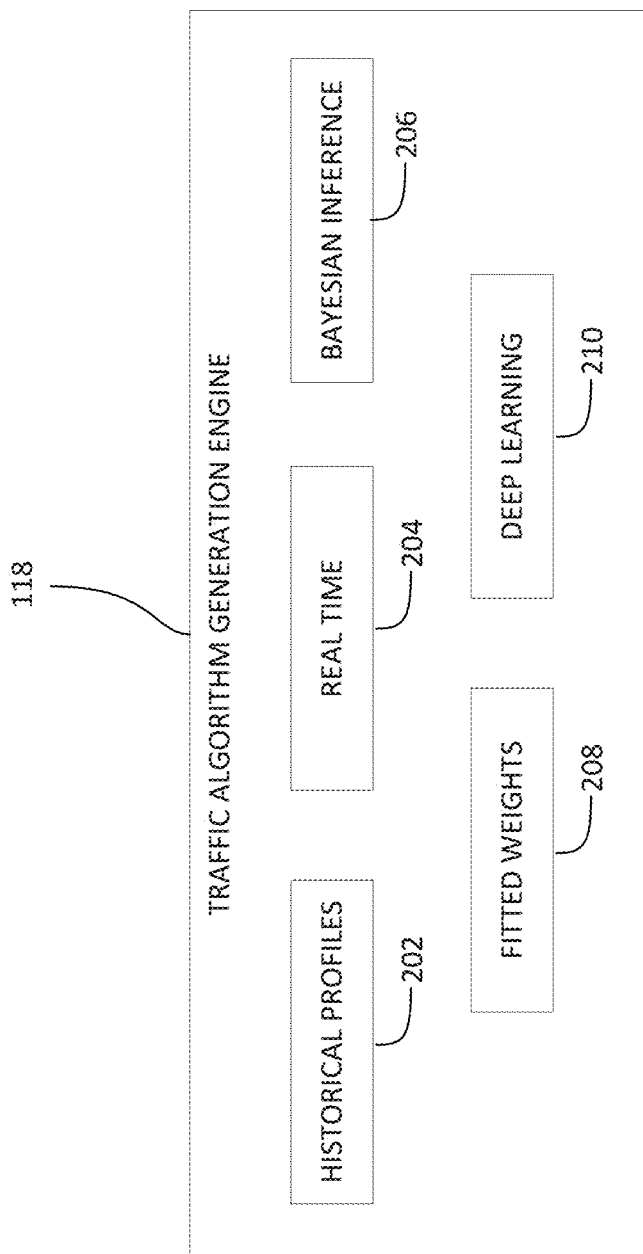
FIG. 2 illustrates a detailed schematic of a portion of the example system of FIG. 1 according to some aspects described herein.

FIG. 2 illustrates a detailed schematic of the traffic algorithm generation component or engine 118 of the example system 100 for generating traffic data. The traffic algorithm generation component 118 includes a plurality of components or engines that implement various aspects of the traffic algorithm generation component 114. For example, the traffic algorithm generation component can include a historical profiles component 202, a real-time component 204, a Bayesian inference component 206, a fitted weights component 208, and/or a deep learning component 210. The plurality of components of the traffic algorithm generation component 118 may store information that is determined from vehicle data (e.g., vehicle data 112) and/or road data (e.g., road data 114).

The historical profiles component 202 may contain (e.g., stored in a memory location corresponding to the historical profiles component 202), and/or generate (e.g., via a calculation) an indication of traffic data (e.g., an estimated travel time from a first location to a second location, a level of congestion between the first and second location, an estimated number of vehicles at a given time, etc.) based on vehicle data (e.g., vehicle data 112) and/or road data (e.g., road data 114). For example, based on vehicle data and/or road data that is received, a historical profile of traffic data may be selected from a plurality of historical profiles of traffic data, such as historical profiles that have been generated based on a 1-year time interval, or a 5-year time interval, or any historical duration of time designated by a user. Each of the plurality of historical profiles may have a confidence value based on the vehicle data and/or road data that is received. The selected historical profile may have the highest confidence value of the plurality of historical profiles. The historical profile component may be advantageous for use in some examples, such as examples where accurate real-time traffic data is not preferred and/or a computational cost of generating traffic data is desired to be reduced.

The real-time component 204 may contain (e.g., stored in a memory location corresponding to the real-time component 204), and/or generate (e.g., via a calculation) an indication of traffic data (e.g., an estimated travel time from a first location to a second location, a level of congestion between the first and second location, an estimated number of vehicles at a given time, etc.) based on vehicle data (e.g., vehicle data 112) and/or road data (e.g., road data 114). For example, based on vehicle data and/or road data that is received in real time, traffic data may be calculated (e.g., in real time or near-real time) using real time data. The real-time component may be advantageous for use in some examples, such as examples where accurate real-time data is readily available and/or a computational cost of generating traffic data can be relatively increased.

The Bayesian inference component 206 may contain (e.g., stored in a memory location corresponding to the Bayesian inference component 206), and/or generate (e.g., via a calculation) an indication of traffic data (e.g., an estimated travel time from a first location to a second location, a level of congestion between the first and second location, an estimated number of vehicles at a given time, etc.) based on vehicle data (e.g., vehicle data 112) and/or road data (e.g., road data 114). For example, based on vehicle data and/or road data that is received, the Bayesian inference component 206, may calculate traffic data using a Bayesian inference algorithm.

The fitted weights component 208 may contain (e.g., stored in a memory location corresponding to the fitted weights component 208), and/or generate (e.g., via a calculation) an indication of traffic data (e.g., an estimated travel time from a first location to a second location, a level of congestion between the first and second location, an estimated number of vehicles at a given time, etc.) based on vehicle data (e.g., vehicle data 112) and/or road data (e.g., road data 114). Weights for one or more aspects of the vehicle data may be determined from a sample of ground truth vehicle data and road data. For example, based on vehicle data and/or road data that is received, the fitted weights component 208, may calculate traffic data using a fitted weights algorithm.

The deep learning component 210 may contain (e.g., stored in a memory location corresponding to the deep learning component 210), and/or generate (e.g., via a calculation) an indication of traffic data (e.g., an estimated travel time from a first location to a second location, a level of congestion between the first and second location, an estimated number of vehicles at a given time, etc.) based on vehicle data (e.g., vehicle data 112) and/or road data (e.g., road data 114). For example, based on vehicle data and/or road data that is received, the deep learning component 210, may calculate traffic data using a deep learning algorithm.

Generally, the traffic algorithm generation engine 118 generates traffic data, such as an estimated travel time from a first location to a second location, a level of congestion between the first and second location, an estimated number of vehicles at a given time, etc., using one or more traffic algorithms (e.g., historical profiles, real-time, Bayesian inference, fitted weights, deep learning, etc.). Additional, and/or alternative traffic algorithms may be recognized by those of ordinary skill in the art. Components corresponding to such known algorithms may be included in the traffic algorithm generation engine 118 to store and/or generate an indication of traffic data, based on the known traffic algorithm.

Figure 3:
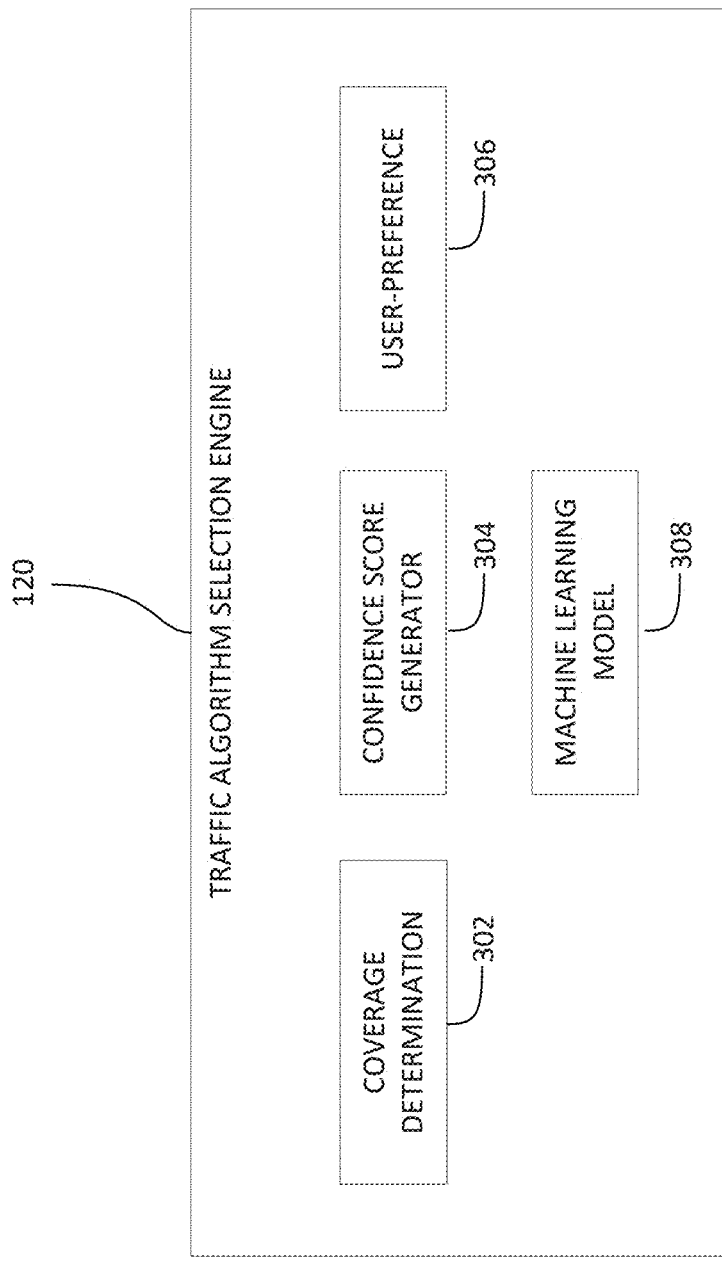
FIG. 3 illustrates a detailed schematic of a portion of the example system of FIG. 1 according to some aspects described herein.

FIG. 3 illustrates a detailed schematic of the traffic algorithm selection component or engine 120 of the example system 100 for generating traffic data. The traffic algorithm selection component 120 includes a plurality of components or engines that implement various aspects of the traffic algorithm selection component 120. For example, the traffic algorithm selection component 120 can include a coverage determination component 302, a confidence score generator component 304, a user-preference component 306, and/or a machine learning model 308.

The coverage determination component 302 may contain (e.g., stored in a memory location corresponding to the coverage determination component 302), and/or generate an indication of traffic coverage. For example, the indication of traffic coverage may correspond to one or more configurable levels of traffic coverage (e.g., a first or high level, a second or medium level, a third or low level, etc.). The traffic coverage may be one or more of a penetration rate of vehicles on a road, a density of vehicles on a road, a number of vehicles on a road, and/or a number of devices (e.g. mobile phones or smart watches) on a road from which vehicle data is being received. The traffic coverage may be determined based on vehicle data (e.g., vehicle data 112) and/or road data (e.g., road data 114). Additionally, or alternatively, the traffic coverage may be determined based on a subset of the vehicle data and/or on a subset of the road data. The coverage may also be determined from historical data.

As mentioned above, in some examples, the traffic coverage may include a first or high level of coverage, a second or medium level of coverage, and a third or low level of coverage. Additional, and/or alternative levels of coverage may be recognized by those of ordinary skill in the art. The first level of coverage may correspond to a relatively high number of vehicles (e.g., based on the vehicle data) travelling on a road (e.g., based on the road data). The third level of coverage may correspond to a relatively low number of vehicles (e.g., based on the vehicle data) travelling on the road (e.g., based on the road data). The second level of coverage may correspond to a number of vehicles (e.g., based on the vehicle data) that is relatively higher than the third level of coverage and relatively lower than the first level of coverage travelling on the road (e.g., based on the road data).

The confidence score component 304 may contain (e.g., stored in a memory location corresponding to the confidence score component 304), and/or generate an indication of a confidence score of traffic data corresponding to a respective traffic algorithm. For example, each of the traffic algorithms of the traffic algorithm generation component 118 (e.g., historical profiles 202, real-time 204, Bayesian inference 206, fitted weights 208, deep learning 210, etc.) may generate traffic data with a corresponding confidence score. The confidence score may be a predicted accuracy of the traffic data (e.g., an estimated travel time from a first location to a second location, a level of congestion between the first and second location, an estimated number of vehicles at a given time, etc.). Generally, some algorithms may have higher confidence scores relative to other algorithms, and vice-versa. For example, a real-time or deep learning algorithm have a higher confidence score than a Bayesian inference or historical profile algorithm. However, a real-time or deep learning algorithm may be more computationally expensive to generate traffic data than a Bayesian inference or historical profile algorithm. Therefore, a user may configure preferences for how accurate an algorithm should be and/or how much computational cost a user is willing to tolerate.

The user-preference component 306 may contain (e.g., stored in a memory location corresponding to the user-preference component 306), and/or generate an indication of a user-preference for generating traffic data. For example, as mentioned earlier herein, a user may configure preferences for how accurate an algorithm should be and/or how much computational cost a user is willing to tolerate. Therefore, mechanisms disclosed herein may receive a user-input corresponding to a preference of how accurate an algorithm should be, such as, for example, by selecting or inputting a pre-determined threshold than which a confidence score should be greater. Additionally, or alternatively, a user may configure preferences of mechanisms disclosed herein for additional system configurations, such as computational cost and/or latency.

In some examples, a first user (e.g., a service provider, such as a commercial delivery driver) may provide user-preferences to mechanisms disclosed herein indicating that they desire a confidence score greater than 70%, or greater than 80%, or greater than 90%, whereas a second user (e.g., a non-service provider) may provide user-preferences to mechanisms disclosed herein indicating that they desire a confidence score of less than the first user. Accordingly, algorithms disclosed herein that generate traffic data, and that have a relatively high confidence score (e.g., real-time, deep learning, etc.) may be used to generate traffic data for the first user. Additionally, or alternatively, algorithms disclosed herein that generate traffic data, and that have a relatively lower confidence score (e.g., historical profiles, Bayesian inference, etc.) may be used to generate traffic data for the second user. Mechanisms disclosed herein may further learn preferences of a user, based on selections made by the user.

The machine learning model component 308 may contain (e.g., stored in a memory location corresponding to the machine learning model component 308), and/or train a machine learning model. For example, as mentioned earlier herein, mechanisms disclosed herein may learn preferences of a user automatically. Specifically, the machine learning model 308 may be trained to determine, for each of a plurality of users, an accuracy tolerance, a computational cost tolerance, confidence tolerance, and/or a latency tolerance. This can enable personalized recommendations based on user-preferences.

The machine learning model may be any type of machine learning model, such as, for example, a supervised machine learning model, and unsupervised machine learning model, and/or a semi-supervised machine learning model. In some examples, mechanisms disclosed herein may provide as an output, a plurality of sets of traffic data that are each generated using a different traffic algorithm (e.g., from the traffic algorithm generation engine 118). Each of the plurality of sets of traffic data may have a corresponding accuracy (e.g., confidence score), computational cost (e.g., computational power needed to generate the traffic data), and/or latency (e.g., time needed to generate the traffic data). A user may select one of the plurality of sets of traffic data, and the machine learning model (e.g., of the machine learning model component 308) may learn (e.g., update weighting of an equation using reinforcement learning) preferences for the user, based on the user's selection. The learning of the machine learning model may be iterative such that as sets of traffic data are generated, and the user selects of the sets of traffic data, mechanisms disclosed herein continue to update a weighting (e.g., train) the machine learning model of the machine learning model component 308.

Generally, the traffic algorithm selection engine 120 provides variables and mechanisms with which a traffic algorithm, such as a traffic algorithm generated by the traffic algorithm generation engine 118, may be selected. Traffic data generated by the selected traffic algorithm may then be further processed (e.g., displayed, cleaned, transmitted, etc.). Additional, and/or alternative variables and mechanisms with which a traffic algorithm may be selected may be apparent to those of ordinary skill in the art in light of known references and/or experimentation of teachings disclosed herein.

Figure 4:
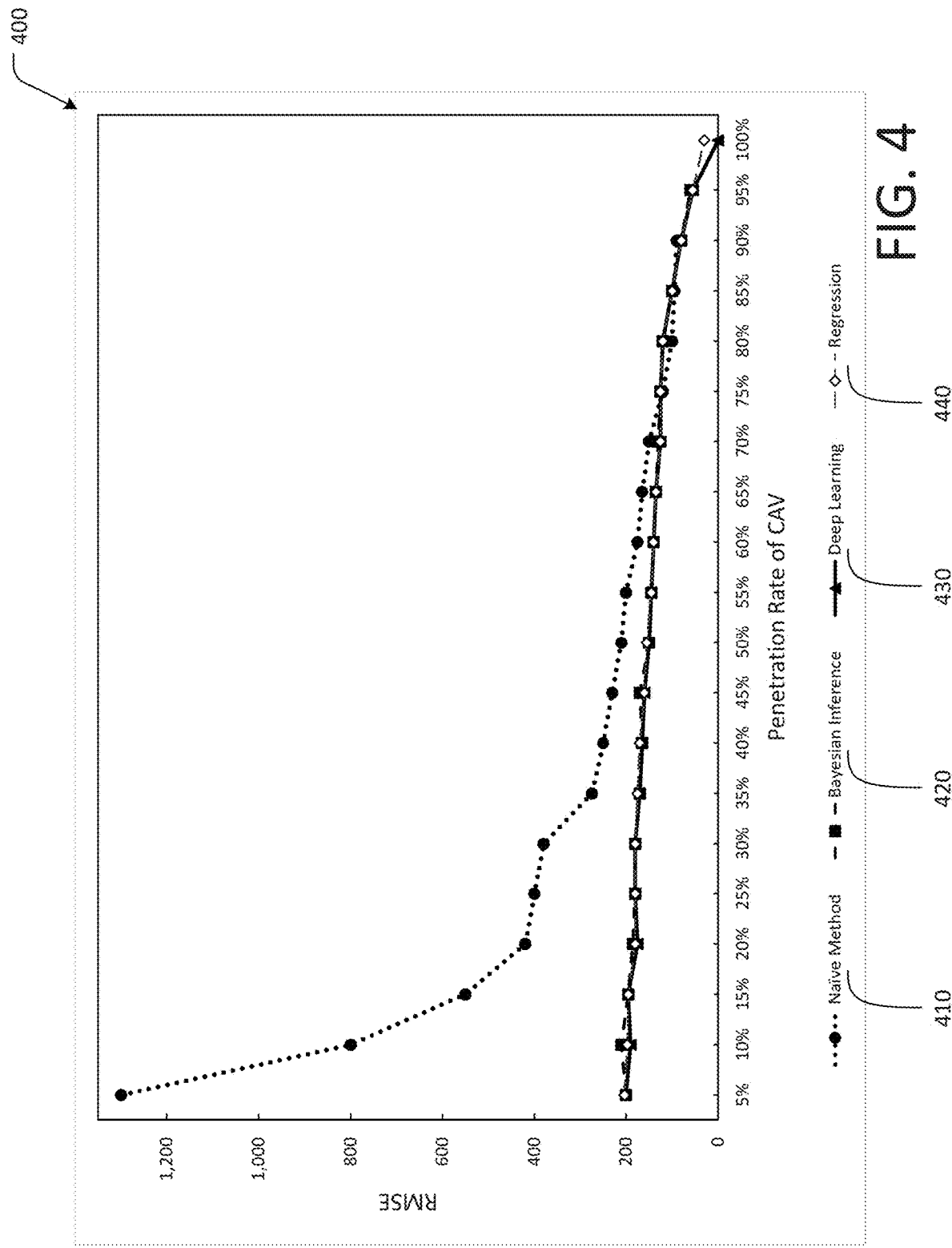
FIG. 4 illustrates an example plot of an accuracy of some example traffic algorithms with respect to coverage according to some aspects described herein.

FIG. 4 illustrates an example plot 400 of an accuracy of some traffic algorithms with respect to coverage. Specifically, the example plot 400 relates a root mean squared error (RMSE) of a Naïve Method algorithm 410, a Bayesian Inference algorithm 420, a Deep Learning algorithm 430, and a Regression algorithm 440 against a penetration rate (e.g., coverage) of connected and autonomous vehicles (CAV). While the example plot 400 relates to connected and autonomous vehicles, it should be recognized that teachings disclosed herein may be extend to vehicles that are not-connected (e.g., vehicle data is provided via a user) and not-autonomous (e.g., partially, and/or fully, manually-driven vehicles).

As shown in FIG. 4, the Naïve Method 410 may be relatively inaccurate at relatively low penetration rates (e.g., of between 5% and 60%). The Bayesian Inference 420 may be relatively inaccurate, with respect to the Naïve Method 410, Deep Learning 430, and Regression 440, at penetration rates of between 85% and 100%. The Deep Learning 430 may be relatively accurate, with respect to the Naïve Method 410, the Bayesian Inference 420, and the Regression 440, at relatively high penetration rates (e.g., of between 95% and 100%).

Generally, FIG. 4 illustrates that it may be preferable to use different traffic algorithms depending on a coverage (e.g., penetration rate) of a specific road, such as may be determined using vehicle data (e.g., vehicle data 112) and/or road data (e.g., road data 114) because different traffic algorithms may have different accuracies, depending on the determined coverage. Furthermore, algorithms such as Deep Learning require more computational power than real time or other Naïve methods.

Figure 5:
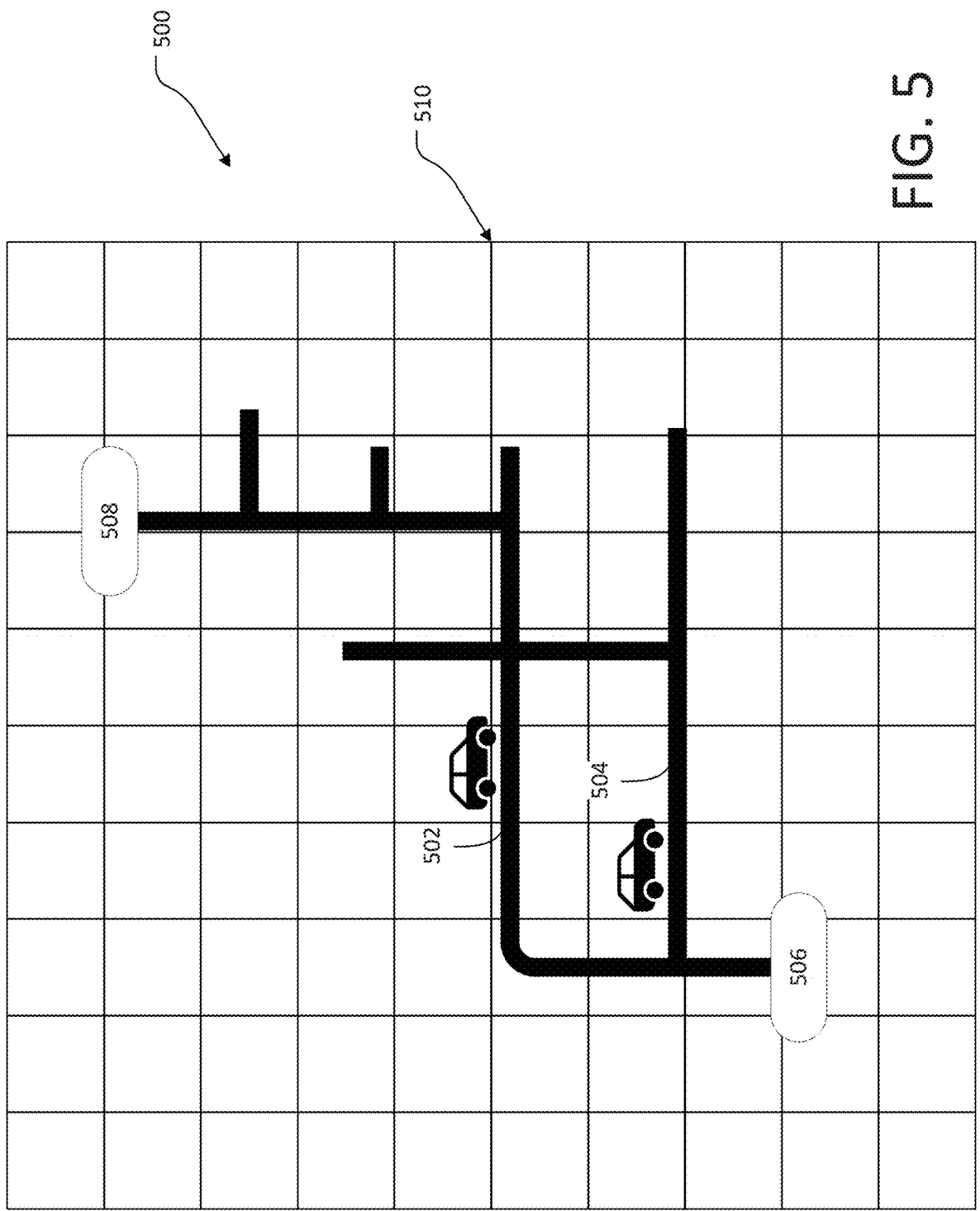
FIG. 5 illustrates an example map according to some aspects described herein.

FIG. 5 illustrates an example map 500 according to some aspects disclosed herein. The example map 500 includes one or more routes, such as a first route 502 and a second route 504 from a first location 506 to a second location 508. The one or more routes 502, 504 may be segmented based on a plurality of grid spaces 510 on the map 500. Dimensions of each of the plurality of grid spaces 510 may be configurable (e.g., a user may configure the spaces to be any size or shape). Further, while each of the grid spaces 510 are shown to be the same size, it is considered that a first subset of the plurality of grid spaces 510 may be dimensioned differently than a second subset of the plurality of grid spaces 510.

Figure 6:
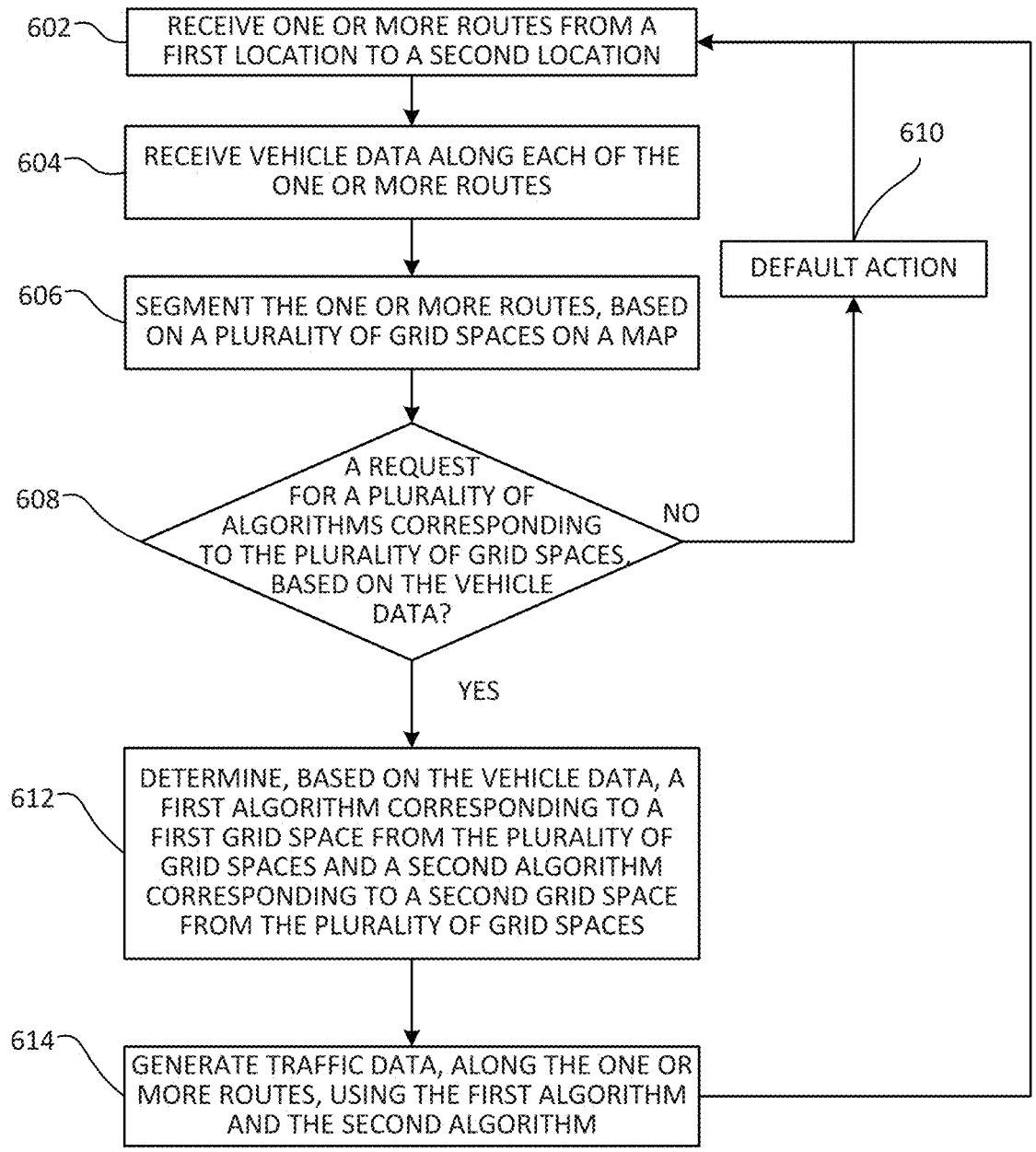
FIG. 6 illustrates an example method of generating traffic data according to some aspects described herein.

FIG. 6 illustrates an example method 600 of generating traffic data according to aspects described herein. In examples, aspects of method 600 are performed by a device, such as computing device 102 and/or server 104, discussed above with respect to FIG. 1.

Method 600 begins at operation 602 wherein one or more routes from a first location to a second location are received. For example, referring to the example map 500, the one or more routes may be the first route 502 and the second route 504 that extend from the first location 506 to the second location 508. The one or more routes may comprise a plurality of roads. The one or more routes may each be a different length (e.g., distance). Further, the one or more routes may each take a different amount of time to travel therealong. Alternatively, in some examples, the one or more routes may be the same length and/or take the same amount of time to travel therealong.

At operation 604, vehicle data is received along each of the one or more routes. The vehicle data received at operation 604 may be similar to the vehicle data 112 discussed earlier herein with respect to the vehicle data source 106 of FIG. 1. One or more vehicles may be travelling along each of the one or more routes. The vehicles may include one or more sensors (e.g., location or GPS sensors, speed sensors, direction sensors, etc.). The vehicle data may be received from the one or more sensors. For example, the vehicle data may be transmitted via a communication system (such as communication system 116) to a computing device and/or server (e.g., computing device 102 and/or server 104) to anonymously aggregate or otherwise process the vehicle data.

The vehicle data may be preprocessed to remove one or more subsets of data. To determine traffic data, it may be beneficial to focus only on vehicles that are actually moving, or that are stationary for a relatively short amount of time (e.g., as may occur in stop-and-go traffic, such as on a congested highway). Therefore, a first subset of data may be identified corresponding to vehicles that have been stationary for longer than a predetermined period of time (e.g., 5 minutes). The first subset may be removed from the vehicle data. Additionally, or alternatively, a second subset of data may be identified corresponding to rideshare vehicles (e.g., vehicles that are consistently stopping on a road and may generate unwanted traffic data). The second subset of data may be removed from the vehicle data. Additionally, or alternatively, a third subset of data may be identified corresponding to commuter vehicles (e.g., transit buses that are consistently stopping on a road and may generate unwanted traffic data). The third subset of data may be removed from the vehicle data.

At operation 606, the one or more routes are segmented, based on a plurality of grid spaces on a map. For example, referring to the example map 500, the first and second routes 502, 504 are each segmented, based on the plurality of grid spaces 510. Dimensions of each of the plurality of grid spaces may be configurable (e.g., a user may configure the grid spaces to be any size or shape). Further, while each of the grid spaces 510 are shown to be the same size, it is considered that a first subset of the plurality of grid spaces 510 may be dimensioned differently than a second subset of the plurality of grid spaces 510. By increasing dimensions of the grid spaces, a user may be choosing to include more of a route within a single grid space, thereby increasing an amount of vehicle data and/or road data corresponding to the grid space with increased dimensions. Conversely, by decreasing dimensions of the grid spaces, a user may be choosing to include less of a route within a single grid space, thereby decreasing an amount of vehicle data and/or road data corresponding to the grid space with decreased dimensions.

At determination 608 it is determined if there is a request for a plurality of algorithms correspond to the plurality of grid spaces, based on the vehicle data. For example, if each of the plurality of grid spaces contain one or more vehicles therein, then a respective traffic algorithm may be determined for each of the plurality of grid spaces, such as a real time only algorithm. Further, even if no vehicles are contained within one or more of the plurality of grid spaces, a user may still desire to generate traffic data using one or more algorithms. However, if there is no request for using a plurality of algorithms corresponding to the plurality of grid spaces (e.g., to generate traffic data), then a user may not desire to do so.

If it is determined that there is not a request for a plurality of algorithms that correspond to the plurality of grid spaces, based on the vehicle data, flow branches "NO" to operation 610, where a default action is performed. For example, the plurality of grid spaces may have an associated pre-configured action. In other examples, method 600 may comprise determining whether the plurality of grid spaces have an associated default action, such that, in some instances, no action may be performed as a result of the received one or more routes and/or vehicle data. Method 600 may terminate at operation 610. Alternatively, method 600 may return to operation 602 to provide an iterative loop of receiving one or more routes and vehicle data, segmenting the one or more routes, based on a plurality of grid spaces on a map, and determining if a request exists for a plurality of algorithms that correspond to the plurality of grid spaces, based on the vehicle data.

If however, it is determined that a request exists for a plurality of algorithms (e.g., traffic algorithms) corresponding to the plurality of grid spaces, flow instead branches "YES" to operation 612, where, based on the vehicle data, a first algorithm corresponding to a first grid space from the plurality of grid spaces is determined and a second algorithm corresponding to a second grid space from the plurality of grid spaces is determined.

Flow advances to operation 614 where traffic data is generated, along the one or more routes, using the first algorithm and the second algorithm. For example, referring to the map 500, the first route 502 falls within 12 grids. Therefore, as many as 12 different algorithms may be used to generate traffic data along the first route. If however, the dimensions of the grid spaces were to be increased, then there may be fewer than 12 different algorithms that are used to generate traffic data along the first route. Alternatively, if the dimensions of the grid spaces were to be decreased, then there may be greater than 12 different algorithms that may be used to generate traffic data. In some examples, the traffic data may be transmitted to a remote device (e.g., to be displayed to a user and/or further processed).

Generally, mechanisms disclosed herein allow for a computationally inexpensive traffic algorithm to be used in a region with low coverage (e.g., a relatively small number of vehicles), while a computationally expensive traffic algorithm may be used in a region with relatively high coverage (e.g., a relatively large number of vehicles). The ability to automatically select and/or assign traffic algorithms, based on vehicle data within segmented portions (e.g., grid spaces) of a route improves efficiency of traffic data systems. Traffic data calculations may be performed with an appropriate level of accuracy and/or at an appropriate computational cost, based on varying use cases. Further advantages may be apparent to those of ordinary skill in the art.

Method 600 may terminate at operation 614. Alternatively, method 600 may return to operation 602 (or any other operation from method 600) to provide an iterative loop, such as of receiving one or more routes from a first location to a second location and generating traffic data along the one or more routes, using a first algorithm and a second algorithm.

Figure 7:
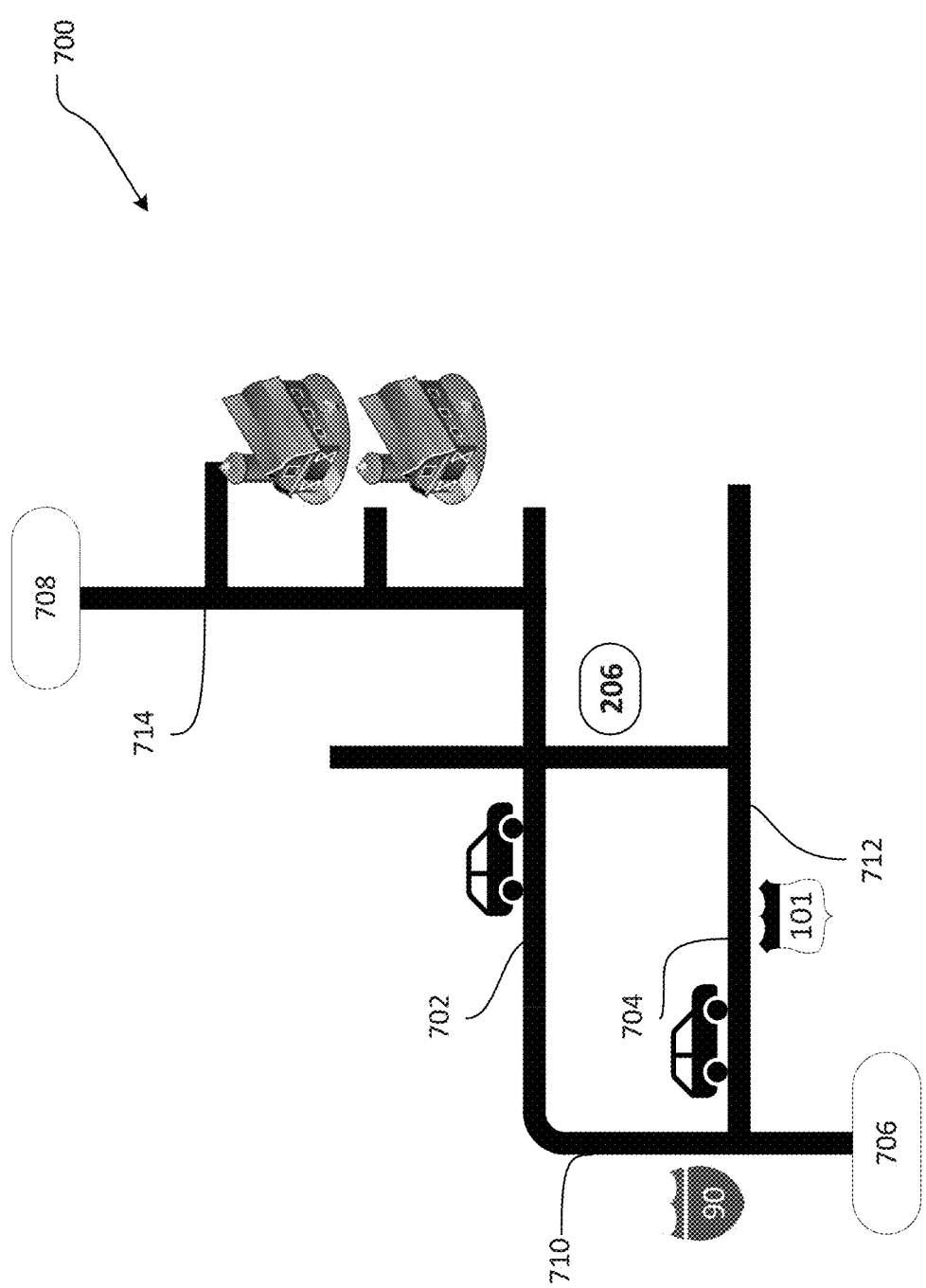
FIG. 7 illustrates an example map according to some aspects described herein.

FIG. 7 illustrates an example map 700 according to some aspects disclosed herein. The example map 700 may be similar to the example map 700 in some aspects, and/or different in some aspects. Therefore, mechanisms (e.g., methods, systems, and/or media) disclosed herein with respect to the example map 500 may be combined, wholly or in-part, with mechanisms disclosed herein with respect to the example map 700.

The example map 700 includes one or more routes, such as a first route 702 and a second route 704 from a first location 706 to a second location 708. The example map 700 further includes a plurality of roads, such as a first road or interstate 710, a second road or highway 712, and a third road or local road 714. The plurality of roads 710, 712, and/or 714 may be segmented based on the respective road types (e.g., interstate, highway, local road, etc.). Further examples of roads and/or maps may be recognized by those of ordinary skill in the art. Therefore, the examples provided herein are non-limiting examples that are meant to help illustrates some aspects of the present disclosure.

Figure 8:
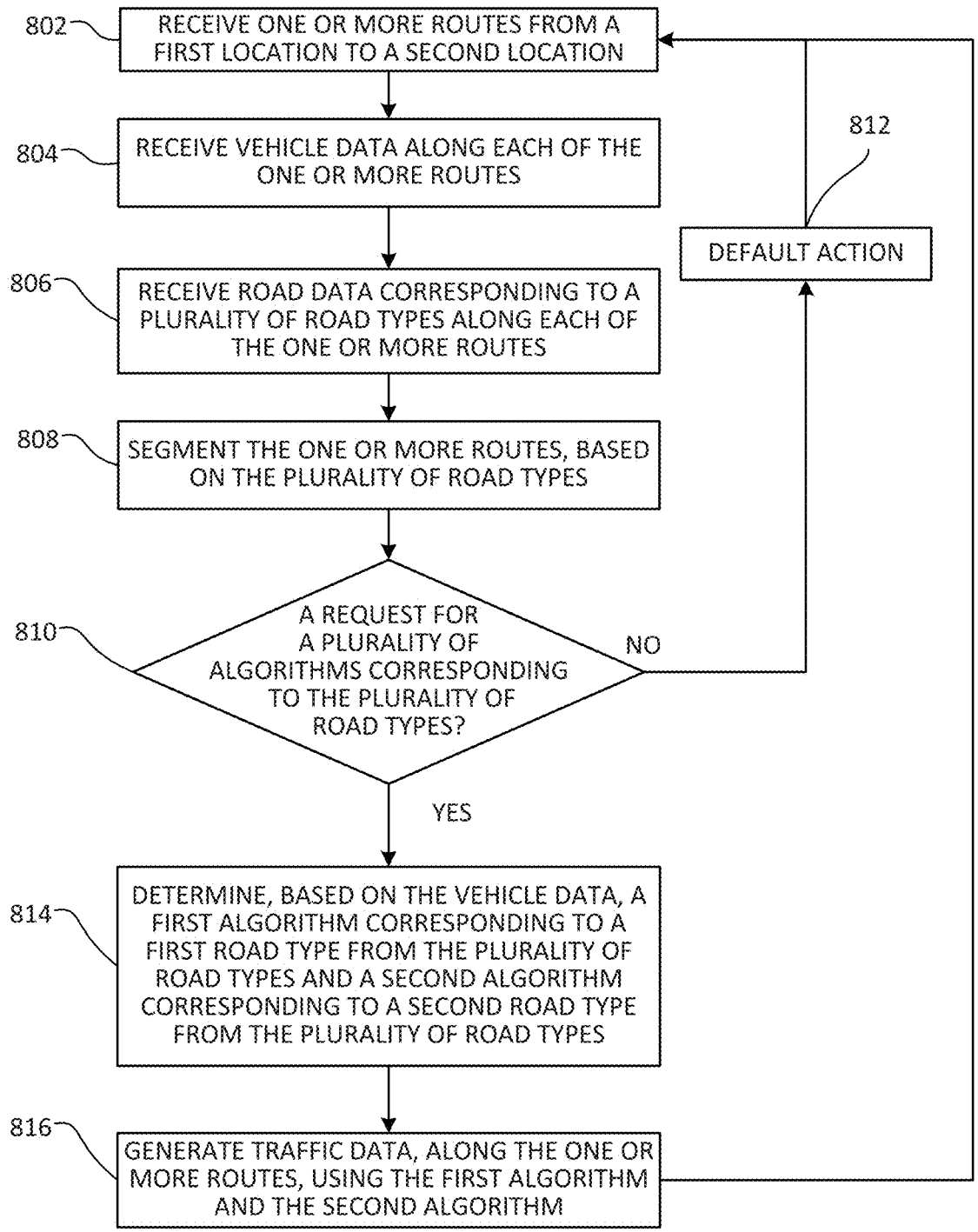
FIG. 8 illustrates an example method of generating traffic data according to some aspects described herein.

FIG. 8 illustrates an example method 800 of generating traffic data according to aspects described herein. In examples, aspects of method 800 are performed by a device, such as computing device 102 and/or server 104, discussed above with respect to FIG. 1.

Method 800 begins at operation 802 wherein one or more routes from a first location to a second location are received. For example, referring to the example map 700, the one or more routes may be the first route 702 and the second route 704 that extend from the first location 706 to the second location 708. The one or more routes may comprise a plurality of roads. The one or more routes may each be a different length (e.g., distance). Further, the one or more routes may each take a different amount of time to travel therealong. Alternatively, in some examples, the one or more routes may be the same length and/or take the same amount of time to travel therealong.

At operation 804, vehicle data is received along each of the one or more routes. The vehicle data received at operation 804 may be similar to the vehicle data 112 discussed earlier herein with respect to the vehicle data source 106 of FIG. 1. One or more vehicles may be travelling along each of the one or more routes. The vehicles may include one or more sensors (e.g., location or GPS sensors, speed sensors, direction sensors, etc.). The vehicle data may be received from the one or more sensors. For example, the vehicle data may be transmitted via a communication system (such as communication system 116) to a computing device and/or server (e.g., computing device 102 and/or server 104) to anonymously aggregate or otherwise process the vehicle data.

The vehicle data may be preprocessed to remove one or more subsets of data. To determine traffic data, it may be beneficial to focus only on vehicles that are actually moving, or that are stationary for a relatively short amount of time (e.g., as may occur in stop-and-go traffic, such as on a congested highway). Therefore, a first subset of data may be identified corresponding to vehicles that have been stationary for longer than a predetermined period of time (e.g., 5 minutes). The first subset may be removed from the vehicle data. Additionally, or alternatively, a second subset of data may be identified corresponding to rideshare vehicles (e.g., vehicles that are consistently stopping on a road and may generate unwanted traffic data). The second subset of data may be removed from the vehicle data. Additionally, or alternatively, a third subset of data may be identified corresponding to commuter vehicles (e.g., transit buses that are consistently stopping on a road and may generate unwanted traffic data). The third subset of data may be removed from the vehicle data.

At operation 806, road data is received along each of the one or more routes that corresponds to a plurality of road types. The road data received at operation 806 may be similar to the road data 114 discussed earlier herein with respect to the road data source 108 of FIG. 1. The road data may include information corresponding to one or more different types of roads, such as highways, tollways, alleyways, local roads, country roads, and/or other types of roads which may have different levels of congestion and/or coverage (e.g., number of vehicles travelling therealong). Different types of roads may be recognized by those of ordinary skill in the art, such as, for example, by referencing publications from government transportation agencies (e.g., a local, state, and/or national Department of Transportation).

At operation 808, the one or more routes are segmented, based on the plurality of road types. For example, referring to the example map 700, the first road or interstate 710 may be a first segment, the second road or highway 101 may be a second segment, and the third road or local road 714 may be a third segment. In some examples, there may be additional and/or alternative road types that each form their own segments of the one or more routes.

At determination 810 it is determined if there is a request for a plurality of algorithms corresponding to the plurality of road types. For example, if each of the plurality of road types contain one or more vehicles travelling therealong, then a respective traffic algorithm may be determined for each of the plurality of road types. Further, even if no vehicles are traveling along one or more of the plurality of road types, a user may still desire to generate traffic data using one or more algorithms. However, if there is no request for using a plurality of algorithms corresponding to the plurality of road types (e.g., to generate traffic data), then a user may not desire to do so.

If it is determined that there is not a request for a plurality of algorithms that correspond to the plurality of road types, flow branches "NO" to operation 812, where a default action is performed. For example, the plurality of road types may have an associated pre-configured action. In other examples, method 800 may comprise determining whether the plurality of road types have an associated default action, such that, in some instances, no action may be performed as a result of the received one or more routes, vehicle data, and/or road data. Method 800 may terminate at operation 812. Alternatively, method 800 may return to operation 802 to provide an iterative loop of receiving one or more routes, vehicle data, and road data, segmenting the one or more routes, based on a plurality of road types, and determining if a plurality of algorithms exist that correspond to the plurality of road types.

If however, it is determined that a request exists for a plurality of algorithms (e.g., traffic algorithms) corresponding to the plurality of road types, flow instead branches "YES" to operation 814, where, based on the vehicle data and/or road data, a first algorithm corresponding to a first road type from the plurality of road types is determined and a second algorithm corresponding to a second road type from the plurality of road types is determined.

Flow advances to operation 816 where traffic data is generated, along the one or more routes, using the first algorithm and the second algorithm. For example, referring to the map 700, the first route 702 includes the first road or tollway 710 and the third road or local road 714. Therefore, traffic data may be generated along the tollway using a first algorithm, while traffic data may be generated along the local road using a second algorithm. Such a multi-algorithm configuration for generating traffic data may be beneficial because the tollway may have a relatively higher coverage than the local road. Therefore, it may be beneficial to use a real-time or deep learning algorithm along the tollway, whereas it may be beneficial to use a Bayesian inference or historical profile algorithm along the local road (e.g., to be displayed to a user and/or further processed).

Generally, mechanisms disclosed herein allow for a computationally inexpensive traffic algorithm to be used in a region with low coverage (e.g., a relatively small number of vehicles), while a computationally expensive traffic algorithm may be used in a region with relatively high coverage (e.g., a relatively large number of vehicles). The ability to automatically select and/or assign traffic algorithms, based on vehicle data along segmented portions (e.g., a plurality of different road types) of a route improves efficiency of traffic data systems. Traffic data calculations may be performed with an appropriate level of accuracy and/or at an appropriate computational cost, based on varying use cases. Further advantages may be apparent to those of ordinary skill in the art.

Method 800 may terminate at operation 816. Alternatively, method 800 may return to operation 802 (or any other operation from method 800) to provide an iterative loop, such as of receiving one or more routes from a first location to a second location, and generating traffic data, along the one or more routes, using a first algorithm and a second algorithm.

Further, aspects of method 800 (e.g., operation 806-816) may be combined with aspects of operation 600 (e.g., operation 606-614). For example, one or more algorithms can be determined based segmentations of one or more routes across a plurality of grid spaces on a map, and one or more algorithms can be determined based on segmentations of one or more routes across a plurality of road types. Traffic data can be generated, along the one or more routes, using at least two of the one or more algorithms determined using the plurality of road type and the one or more algorithms determined using the plurality of grid spaces.

Figure 9:
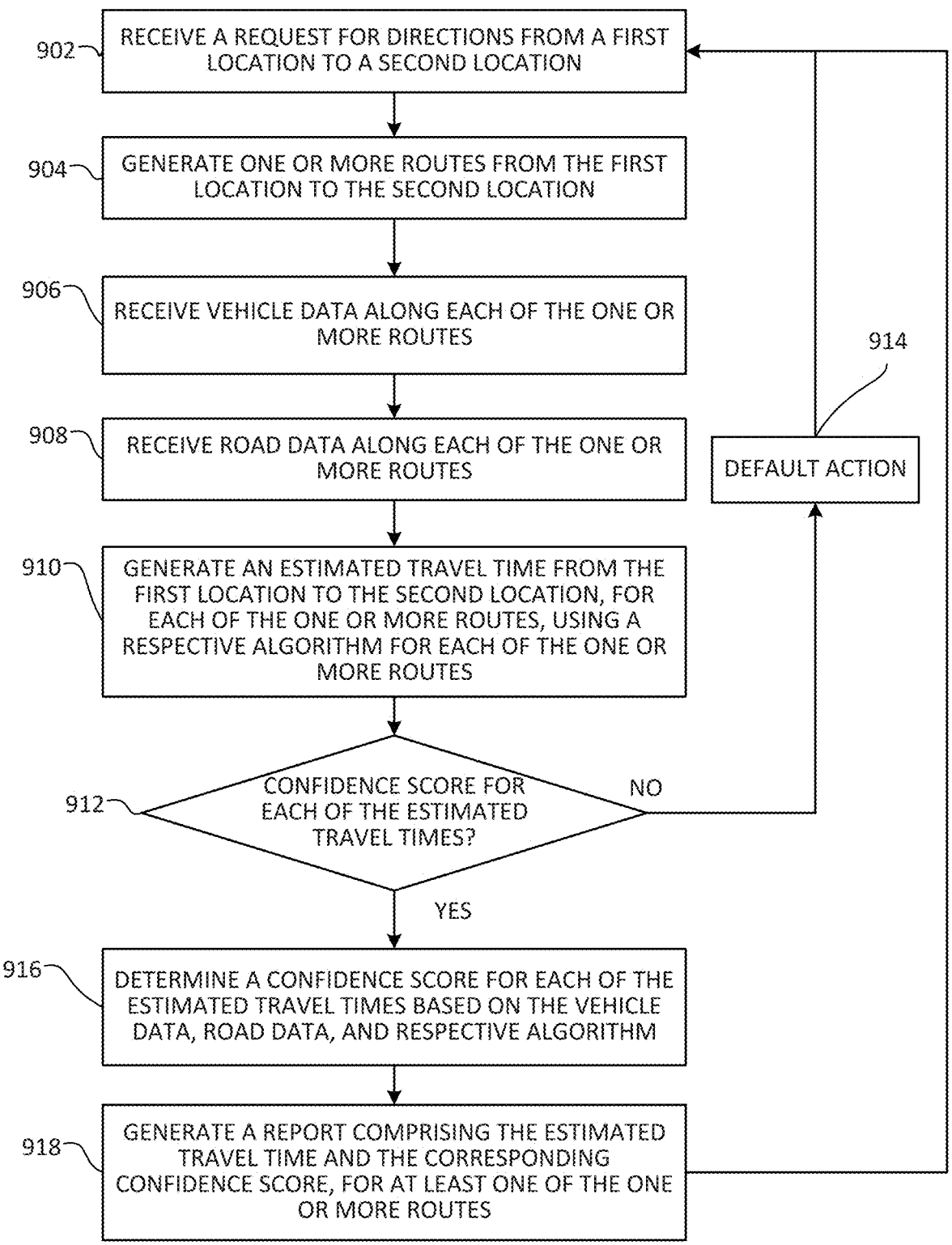
FIG. 9 illustrates an example method of generating traffic data according to some aspects described herein.

FIG. 9 illustrates an example method 900 of generating traffic data according to aspects described herein. In examples, aspects of method 900 are performed by a device, such as computing device 102 and/or server 104, discussed above with respect to FIG. 1.

Method 900 begins at operation 902 wherein a request for directions from a first location to a second location is received. For example, referring to the example map 700, the request may be for directions from the first location 706 to the second location 708. The request for directions may be provided by a user-input. For example, a user may enter the request for directions via a mobile application, desktop application, and or web-based portal.

At operation 904, one or more routes from the first location to the second location are generated. For example, referring to the example map 700, the one or more routes may be the first route 702 and the second route 704 that extend from the first location 706 to the second location 708. The one or more routes may comprise a plurality of roads. The one or more routes may each be a different length (e.g., distance). Further, the one or more routes may each take a different amount of time to travel therealong. Alternatively, in some examples, the one or more routes may be the same length and/or take the same amount of time to travel therealong.

At operation 906, vehicle data is received along each of the one or more routes. The vehicle data received at operation 906 may be similar to the vehicle data 112 discussed earlier herein with respect to the vehicle data source 106 of FIG. 1. One or more vehicles may be travelling along each of the one or more routes. The vehicles may include one or more sensors (e.g., location or GPS sensors, speed sensors, direction sensors, etc.). The vehicle data may be received from the one or more sensors. For example, the vehicle data may be transmitted via a communication system (such as communication system 116) to a computing device and/or server (e.g., computing device 102 and/or server 104) to anonymously aggregate or otherwise process the vehicle data.

The vehicle data may be preprocessed to remove one or more subsets of data. To determine traffic data, it may be beneficial to focus only on vehicles that are actually moving, or that are stationary for a relatively short amount of time (e.g., as may occur in stop-and-go traffic, such as on a congested highway). Therefore, a first subset of data may be identified corresponding to vehicles that have been stationary for longer than a predetermined period of time (e.g., 5 minutes). The first subset may be removed from the vehicle data. Additionally, or alternatively, a second subset of data may be identified corresponding to rideshare vehicles (e.g., vehicles that are consistently stopping on a road and may generate unwanted traffic data). The second subset of data may be removed from the vehicle data. Additionally, or alternatively, a third subset of data may be identified corresponding to commuter vehicles (e.g., transit buses that are consistently stopping on a road and may generate unwanted traffic data). The third subset of data may be removed from the vehicle data.

At operation 908, road data is received along each of the one or more routes that corresponds to a plurality of road types. The road data received at operation 908 may be similar to the road data 114 discussed earlier herein with respect to the road data source 108 of FIG. 1. The road data may include information corresponding to one or more different types of roads, such as highways, tollways, alleyways, local roads, country roads, and/or other types of roads which may have different levels of congestion and/or coverage (e.g., number of vehicles travelling therealong). Different types of roads may be recognized by those of ordinary skill in the art, such as, for example, by referencing publications from government transportation agencies (e.g., a local, state, and/or national Department of Transportation).

At operation 910, an estimated travel time from the first location to the second location is generated, for each of the one or more routes, using a respective algorithm for each of the one or more routes. The respective algorithm may be one or more of the algorithms discussed earlier herein with respect to the traffic algorithm generation engine 118 (e.g., historical profiles, real time, Bayesian inference, fitted weights, deep learning, etc.). The one or more routes may be a plurality of routes and the estimated travel times for the plurality of routes may be generated using at least two different algorithms.

At determination 912 it is determined if a confidence score exists for each of the estimated travel times. For example, different traffic algorithms may compute estimated travel times with different confidence scores, based on error corresponding to the traffic algorithm at a given coverage. However, if an error is not known for a traffic algorithm, then it may need to be calculated (e.g., based on a known coverage, a trained error estimator, etc.).

If it is determined that there is not a confidence score for each of the estimated travel times, flow branches "NO" to operation 914, where a default action is performed. For example, the estimated travel times may have an associated pre-configured action. In other examples, method 900 may comprise determining whether the estimated travel times have an associated default action, such that, in some instances, no action may be performed as a result of the generated estimated travel times. Method 900 may terminate at operation 914. Alternatively, method 900 may return to operation 902 to provide an iterative loop of receiving a request for directions from a first location to a second location and generating an estimated travel time from the first location to the second location, for each of one or more routes, using a respective algorithm for each of the one or more routes.

If however, it is determined that each of the estimated travel times have a confidence score, flow instead branches "YES" to operation 916, where, based on the vehicle data, road data, and respective algorithm (e.g., traffic algorithm), a confidence score is determined for each of the estimated travel times. In some examples, the confidence score may be generated using the confidence score generator 304 described earlier herein with respect to FIG. 3.

Flow advances to operation 918 where a report that includes the estimated travel time and the corresponding confidence score of the estimated travel time is generated, for at least one of the one or more routes. The report may be transmitted to a remote device to generate an indication to a user. The remote device (e.g., a laptop, smartphone, etc.) may have a user-interface that is configured to display a map, one or more routes, and/or one or more estimated travel times to a user.

Generally, mechanisms disclosed herein allow for information to be generated that allows a user to determine not only an estimated travel time for each of a plurality of routes, but also a confidence score for how accurate the estimated travel time of the routes may be. Accordingly, if a user needs to arrive at a second location by a specific time, they may choose to take a first route that has a first estimated travel time that is longer than a second estimated travel time of a second route, if the first estimated travel time has a relatively high confidence score, with respect to the second estimated travel time.

Method 900 may terminate at operation 918. Alternatively, method 900 may return to operation 902 (or any other operation from method 900) to provide an iterative loop, such as of receiving a request for directions from a first location to a second location and generating a report that includes an estimated travel time and corresponding confidence score for at least one of the routes.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of computing device configurations that may be utilized for practicing aspects of the disclosure, described herein.

Figure 10:
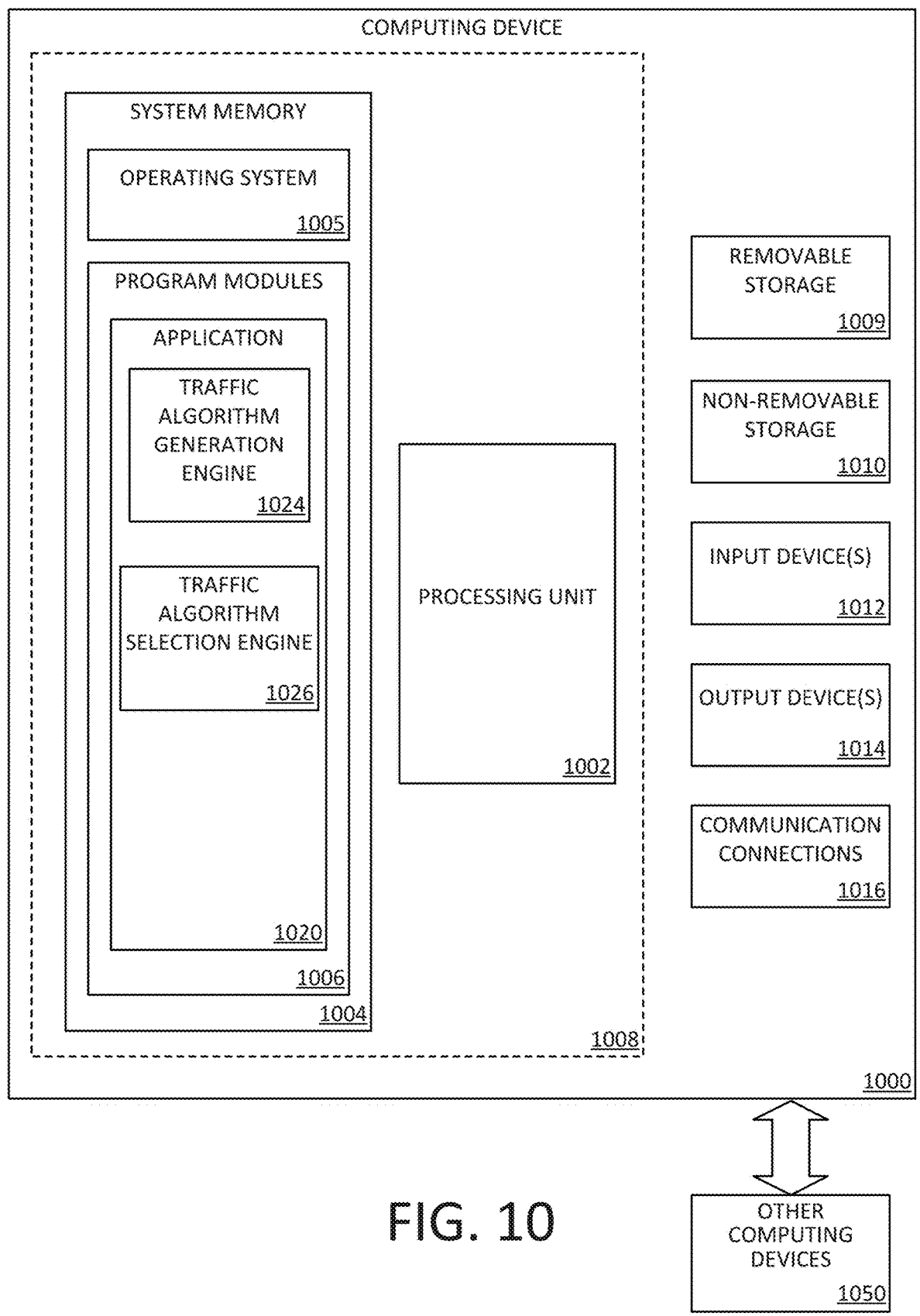
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing devices described above, including computing device 102 in FIG. 1. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software application 1020, such as one or more components supported by the systems described herein. As examples, system memory 1004 may store traffic algorithm generation engine or component 1024 and traffic algorithm selection engine or component 1026. The operating system 1005, for example, may be suitable for controlling the operation of the computing device 1000.

Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
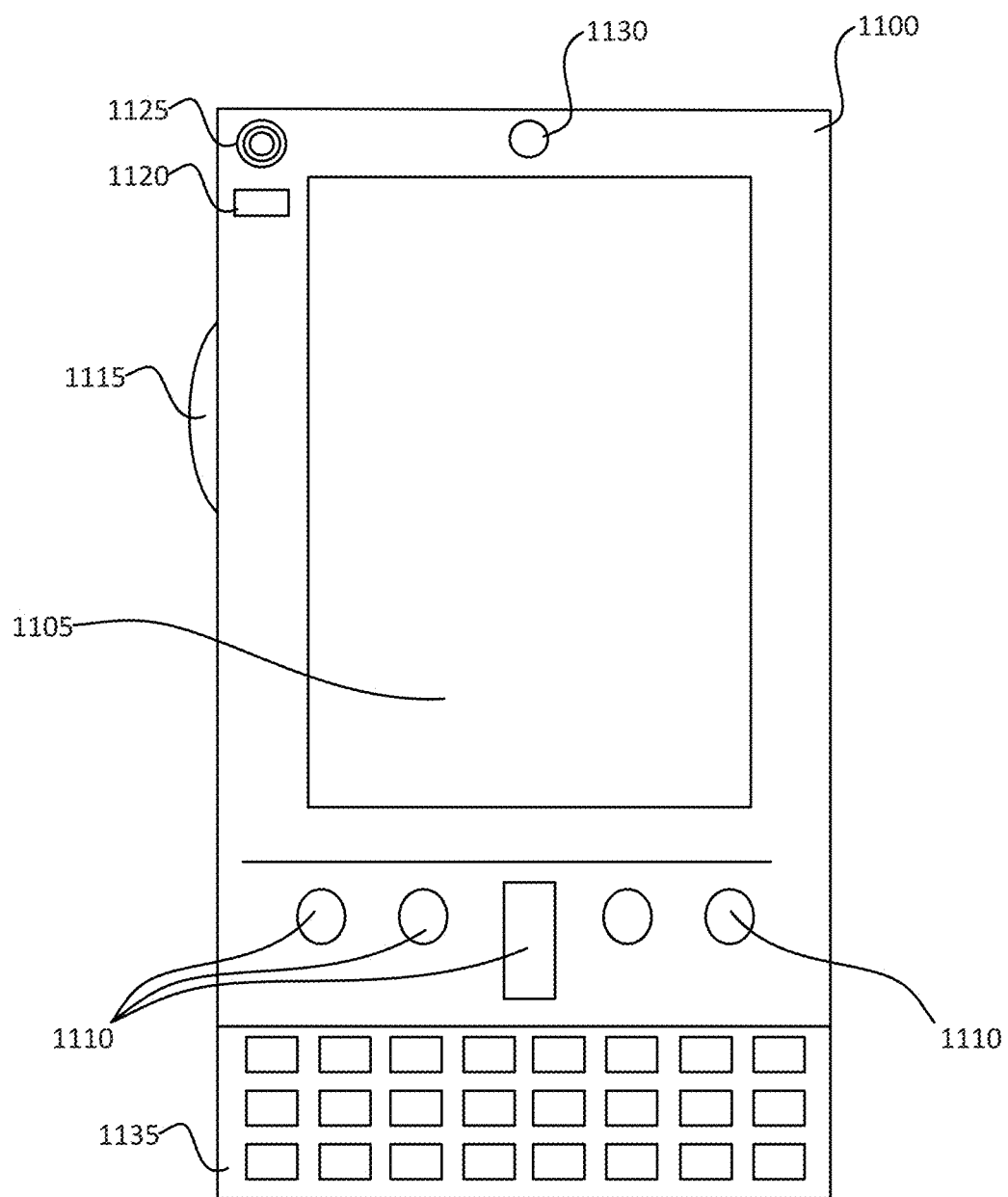
FIGS. 11A and 11B are simplified block diagrams of a mobile computing device with which aspects of the present disclosure may be practiced.
Figure 11B:
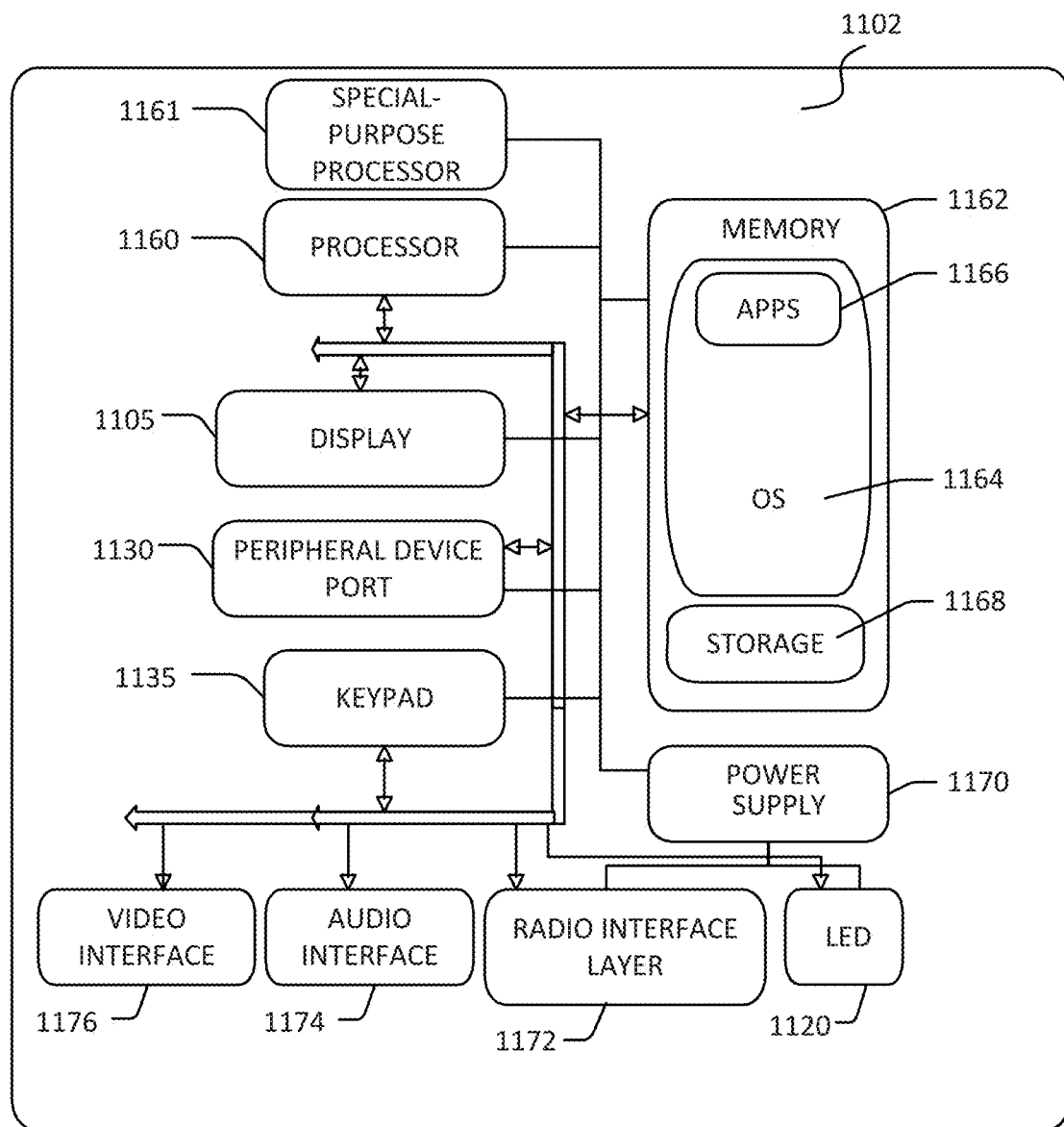

FIGS. 11A and 11B illustrate a mobile computing device 1100, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display).

If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some examples.

In yet another alternative example, the mobile computing device 1100 is a portable phone system, such as a cellular phone. The mobile computing device 1100 may also include an optional keypad 1135. Optional keypad 1135 may be a physical keypad or a "soft" keypad generated on the touch screen display.

In various examples, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In some examples, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., a traffic algorithm generation engine, a traffic algorithm selection engine, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated example, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and/or special-purpose processor 1161 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
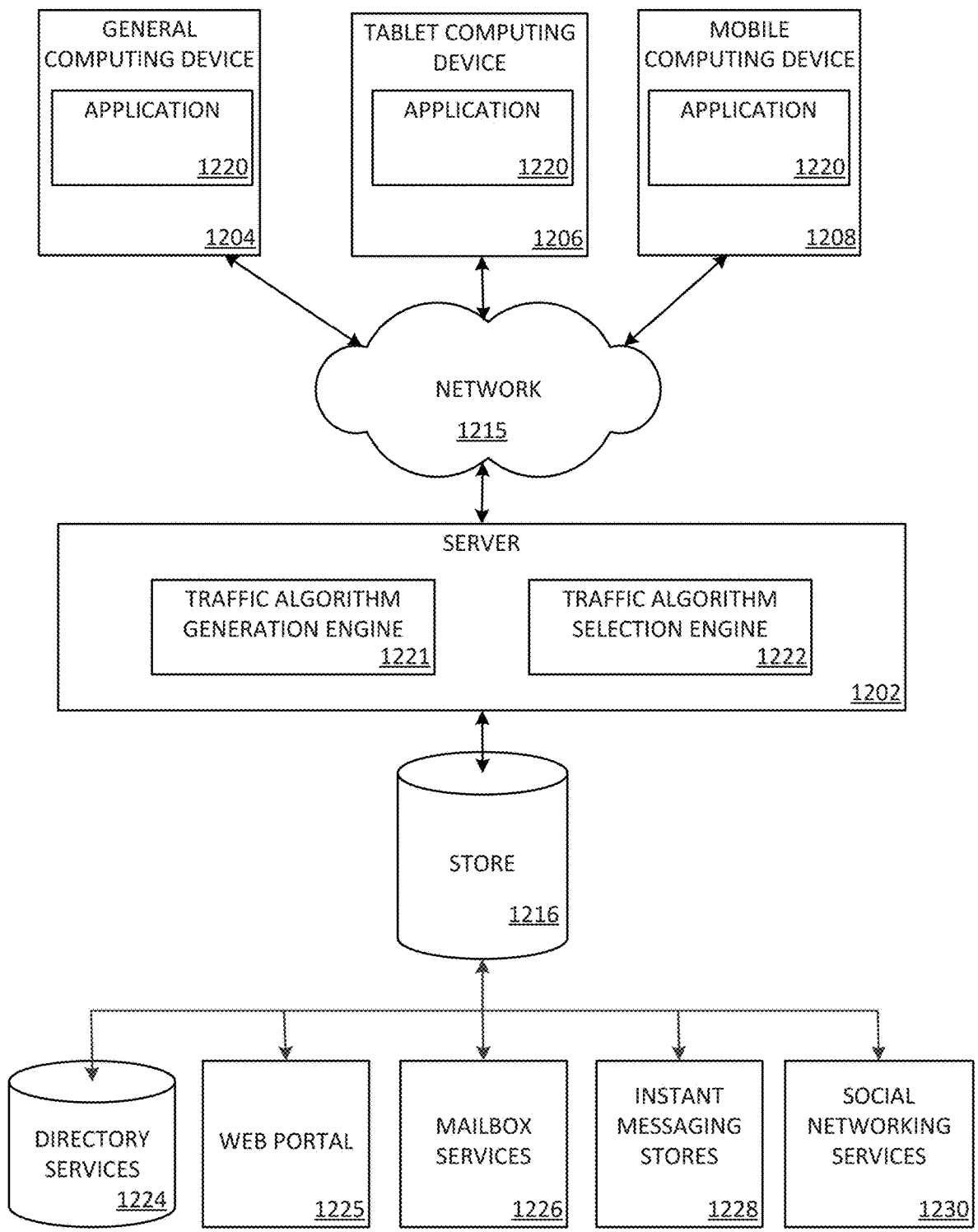
FIG. 12 is a simplified block diagram of a distributed computing system in which aspects of the present disclosure may be practiced.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1224, a web portal 1225, a mailbox service 1226, an instant messaging store 1228, or a social networking site 1230.

An application 1220 (e.g., similar to the application 1020) may be employed by a client that communicates with server device 1202. Additionally, or alternatively, traffic algorithm generation engine 1221 and/or traffic algorithm selection engine 1222 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these examples of the computing devices may obtain content from the store 1216, in addition to receiving graphical data useable to be either pre-processed at a graphic-originating system, or post-processed at a receiving computing system.

Figure 13:
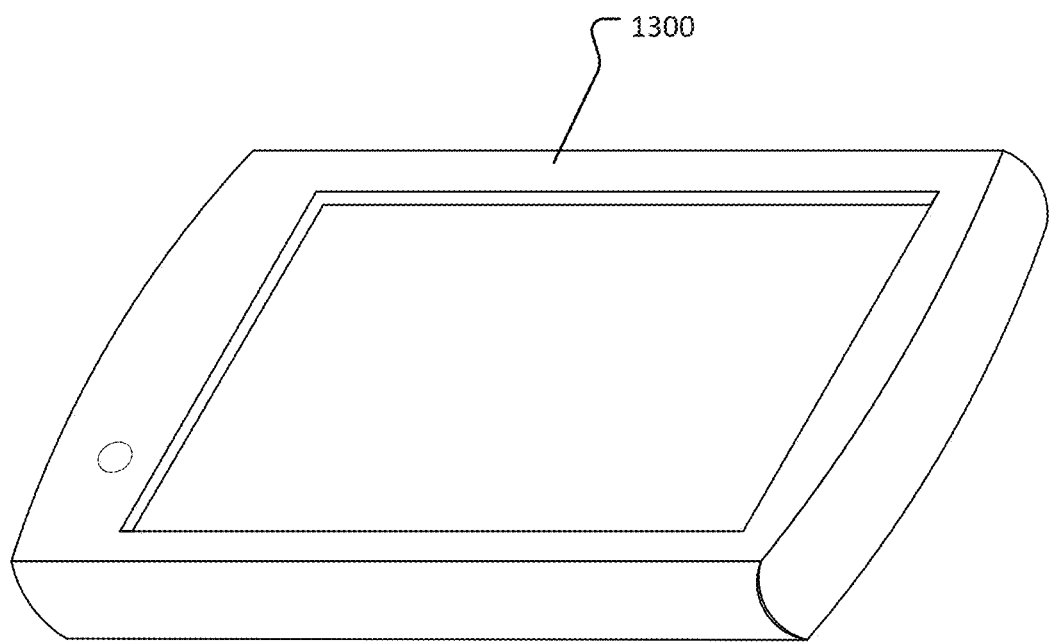
FIG. 13 illustrates a tablet computing device for executing one or more aspects of the present disclosure.

FIG. 13 illustrates an exemplary tablet computing device 1310 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating traffic data, the method comprising:
  receiving one or more routes from a first location to a second location;
  storing, in memory, a plurality of algorithms for generating traffic data;
  receiving vehicle data aggregated from sensors onboard a plurality of vehicles travelling along each of the one or more routes;
  receiving road data corresponding to a plurality of road types along each of the one or more routes;
  defining a plurality of grid spaces on a map, the one or more routes extending through one or more grid spaces of the plurality of grid spaces;
  segmenting, within each grid space of the one or more grid spaces, the one or more routes into a plurality of road segments, wherein each road segment corresponds to a respective road type of the plurality of road types, such that the plurality of road segments includes a first road segment corresponding to a first road type of the plurality of road types and includes a second road segment corresponding to a second road type of the plurality of road types;
  identifying, from the plurality of stored algorithms for generating traffic data and based on the vehicle data aggregated from the sensors onboard the plurality of vehicles, a first algorithm corresponding to a first grid space from the plurality of grid spaces, a second traffic algorithm corresponding to a second grid space from the plurality of grid spaces, a third algorithm corresponding to the first road type, and a fourth algorithm corresponding to the second road type, wherein the identifying is performed based on a received indication of a user-preference input related to at least one of cost or accuracy in generating traffic data; and
  generating traffic data, along the one or more routes, using at least two from the group of the first algorithm, the second algorithm, the third algorithm, and the fourth algorithm.

2. The method of claim 1, wherein the first algorithm is one of a historical algorithm, real-time algorithm, Bayesian inference algorithm, fitted weights algorithm, or deep learning algorithm.

3. The method of claim 1, further comprising:
  transmitting the traffic data to a remote device.

4. The method of claim 1, wherein the traffic data comprises an estimated travel time from the first location to the second location.

5. The method of claim 1, wherein the vehicle data corresponds to a number of vehicles travelling along each of the one or more routes.

6. The method of claim 1, wherein dimensions of each of the plurality of grid spaces are configurable.

7. A method for generating traffic data, the method comprising:
  receiving one or more routes from a first location to a second location;
  storing, in memory, a plurality of algorithms for generating traffic data;
  receiving vehicle data aggregated from sensors onboard a plurality of vehicles travelling along each of the one or more routes;
  receiving road data corresponding to a plurality of road types along each of the one or more routes;
  segmenting the one or more routes into a plurality of road segments, wherein each road segment corresponds to a respective road type of the plurality of road types, such that the plurality of road segments includes a first road segment corresponding to a first road type of the plurality of road types and includes a second road segment corresponding to a second road type of the plurality of road types;
  identifying, from the plurality of stored algorithms for generating traffic data and based on the vehicle data aggregated from the sensors onboard the plurality of vehicles, a first algorithm corresponding to the first road type from the plurality of road types and a second algorithm corresponding to the second road type from the plurality of road types, wherein the identifying is performed using a machine-learning model that is trained to select the first algorithm and the second algorithm based on a received indication of a user-preference input related to at least one of cost or accuracy in generating traffic data; and
  generating traffic data, along the one or more routes, using the first algorithm and the second algorithm.

8. The method of claim 7, further comprising:
  segmenting the one or more routes, based on a plurality of grid spaces on a map; and
  determining, based on the vehicle data, a third algorithm corresponding to a first grid space from the plurality of grid spaces and a fourth traffic algorithm corresponding to a second grid space from the plurality of grid spaces, wherein the traffic data, along the one or more routes, is generated using at least two from the group of the first algorithm, the second algorithm, the third algorithm, and the fourth algorithm.

9. The method of claim 7, wherein the first algorithm is one of a historical algorithm, real-time algorithm, Bayesian inference algorithm, fitted weights algorithm, or deep learning algorithm.

10. The method of claim 7, further comprising:
  transmitting the traffic data to a remote device.

11. The method of claim 7, wherein the traffic data comprises an estimated travel time from the first location to the second location.

12. The method of claim 11, wherein the vehicle data corresponds to a number of vehicles travelling along each of the one or more routes.

13. The method of claim 12, wherein the plurality of road types include one or more from the group of: an interstate, highway, and local road.

14. A method for generating traffic data, the method comprising:
  storing, in memory, a plurality of algorithms;
  receiving a request for directions from a first location to a second location;

generating one or more routes from the first location to the second location;

receiving vehicle data aggregated from sensors onboard a plurality of vehicles travelling along each of the one or more routes;

receiving road data along each of the one or more routes;

generating an estimated travel time from the first location to the second location, for each of the one or more routes, using a respective algorithm for each of the one or more routes selected from the plurality of stored algorithms based on the vehicle data aggregated from the sensors onboard the plurality of vehicles, wherein the selection of the respective algorithms is performed based on a received indication of a user-preference input related to at least one of cost or accuracy in generating traffic data;

determining a confidence score for each of the estimated travel times based on the vehicle data, road data, and respective algorithm; and generating a report comprising the estimated travel time and the corresponding confidence score, for at least one of the one or more routes.

15. The method of claim 14, wherein the vehicle data corresponds to a number of vehicles travelling along each of the one or more routes.

16. The method of claim 14, wherein the road data corresponds to one or more types of roads along each of the one or more routes.

17. The method of claim 16, wherein the one or more types of roads are one or more from the group of: an interstate, highway, and local road.

18. The method of claim 14, wherein the algorithms are each one of a historical algorithm, real-time algorithm, Bayesian inference algorithm, fitted weights algorithm, or deep learning algorithm.

19. The method of claim 14, wherein the vehicle data is preprocessed to remove a subset of data corresponding to vehicles that have been stationary for longer than a predetermined period of time.

20. The method of claim 14, wherein the vehicle data aggregated from the plurality of vehicles and the road data corresponding to the plurality of road types are received in real time.

* * * * *